Dec. 20, 1966   C. L. PEEK   3,292,967
GATE AND RAMP DEVICE FOR LIVESTOCK TRAILER
Filed Jan. 28, 1965   3 Sheets-Sheet 1
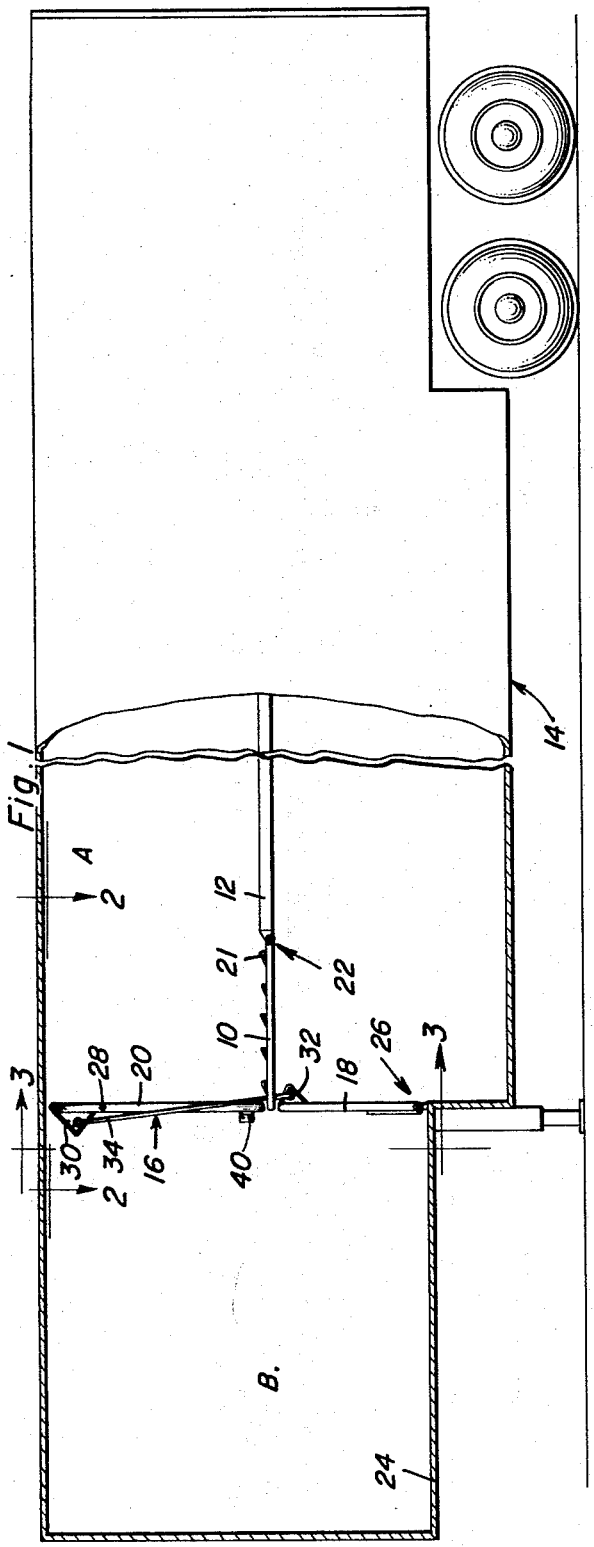
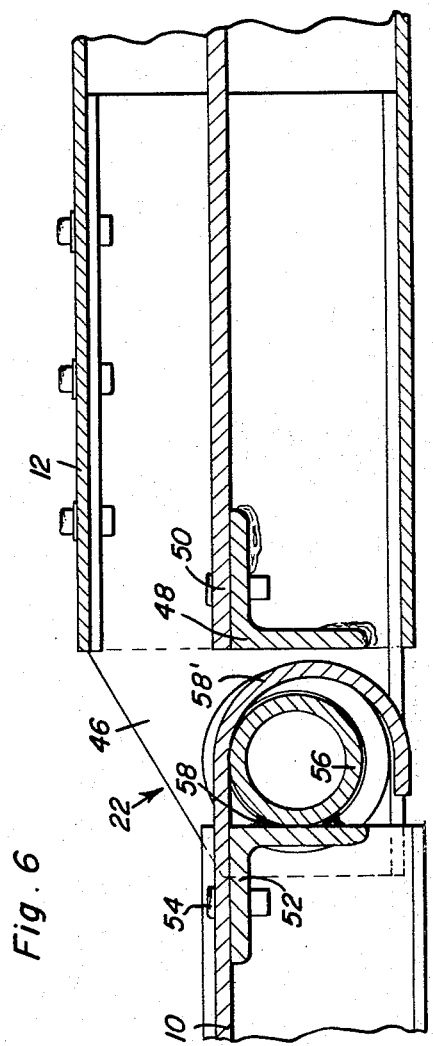
Chester L. Peek
INVENTOR.

Dec. 20, 1966  C. L. PEEK  3,292,967
GATE AND RAMP DEVICE FOR LIVESTOCK TRAILER
Filed Jan. 28, 1965  3 Sheets-Sheet 2

Chester L. Peek
INVENTOR.

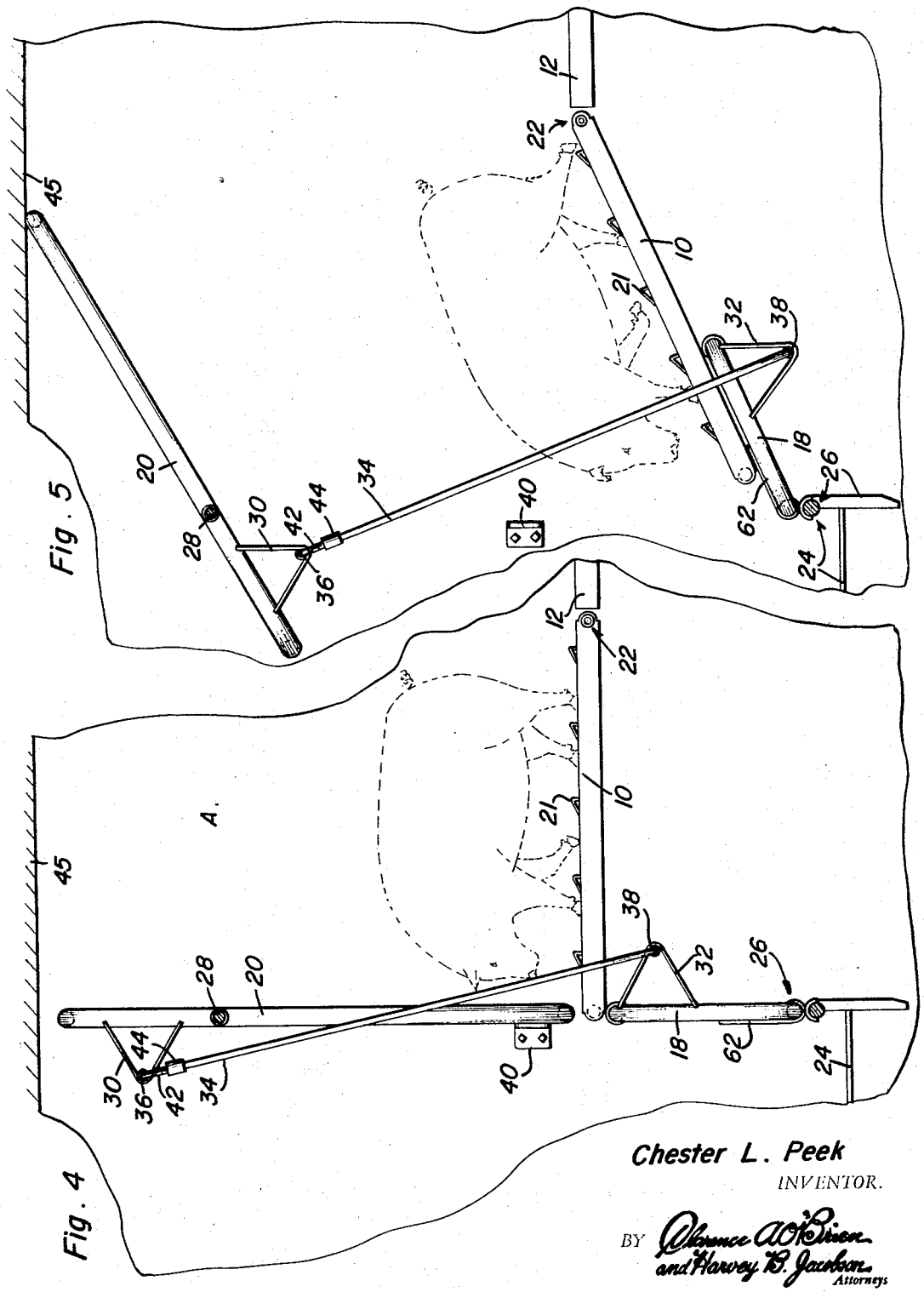

_United States Patent Office_ 3,292,967
Patented Dec. 20, 1966

3,292,967
GATE AND RAMP DEVICE FOR LIVESTOCK TRAILER
Chester L. Peek, Sioux City, Iowa, assignor to Wilson Trailer Company, a corporation of Iowa
Filed Jan. 28, 1965, Ser. No. 428,739
9 Claims. (Cl. 296—24)

This invention generally relates to a livestock trailer having compartments for retaining livestock therein and more particularly to a gate and ramp structure in which the livestock may be loaded or unloaded in relation to the compartments.

The present invention is primarily concerned with double-deck livestock trailers of the drop-center type which may find use in carrying small animals on two decks rather than on one common deck thereby allowing more animals to be carried within the livestock compartments of the trailer. In prior livestock retaining compartments, ramps may be formed from the platform on which the livestock will stand after being herded within the compartment. However these ramps which are known do not use the full width of the platform. It is therefore an object of the present invention to use a ramp extending the full width of the platform when loading the livestock into a compartment in which they will be retained until delivered to a predetermined location.

Another object of the present invention is to provide a gate and ramp device for dividing the front compartment of a drop-center, the double-deck livestock trailer from the main decks and for providing a ramp leading from the upper main deck to the front compartment to facilitate loading and unloading of animals in relation to the front compartment.

A further object of this invention is to provide a ramp and gate means as set forth previously which is easily operable by one man and in which all parts which form the ramp and gate structure are useful for both loading the livestock and in retaining the livestock within the desired compartment of the livestock trailer.

A still further object of the present invention is to provide a ramp and gate combination which is operated by raising and lowering the gate to both lower or raise the ramp.

A further object of the invention is to provide a ramp pivotally connected to a platform elevated from the main lower floor of a double-deck, drop-center livestock trailer. The ramp is supported by the lower section of a sectional gate structure and is allowed to drop from its normal horizontal position to an inclined position by moving the lower section of the gate structure to an inclined position and allowing the ramp to rotate downwardly upon the inclined gate section thereby forming the desired ramp. Connected to the lower gate section is an upper gate section which is pivotally connected to the side walls of the trailer. The gate section is connected to the lower gate section by a connecting rod so that the lower gate section is rotated from its normal vertical position to an inclined position by rotating the upper gate section from a normal vertical position for retaining the livestock within a desired compartment to an inclined position. When the lower gate section is so inclined the ramp will rotate to an inclined position thereby allowing livestock to walk under the upper gate section and down the ramp.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partially cut away side elevational view of the livestock trailer showing the double-deck, drop-center arrangement and the ramp and gate arrangement of this invention;

FIGURE 4 is a sectional view taken along section line 4—4 of FIGURE 3 and showing the gates and ramp in a normal position;

FIGURE 5 is a view of the gate and ramp structure similar to FIGURE 4 but showing the ramp in a lowered or inclined position and the gate in open position; and FIGURE 6 is a sectional view taken along section line 6—6 of FIGURE 2 and showing in detail the hinge arrangement connecting the ramp of this invention to the platform of the double-deck structure.

Figure 3:
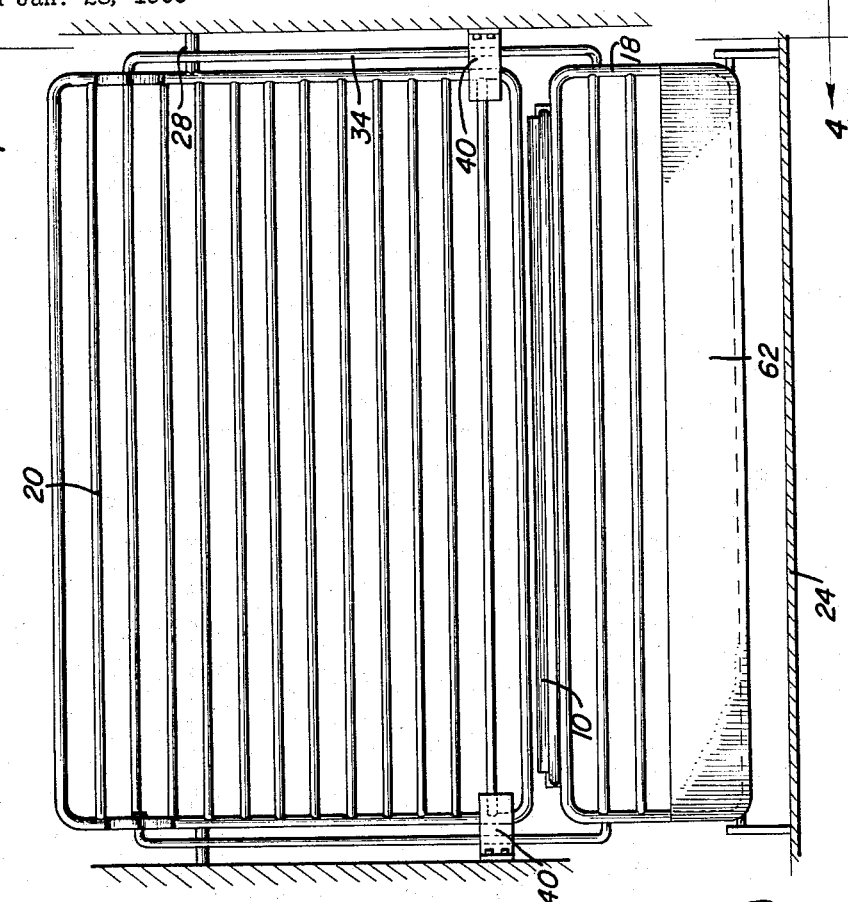
FIGURE 3 is a transverse sectional view taken along section line 3—3 of FIGURE 1.

Referring now to the drawings in detail a ramp 10 is shown in FIGURE 1 connected to the platform 12 or upper main deck of the trailer body 14. Associated with the ramp 10 is a gate structure 16 which is composed of a lower gate section 18 also referred to as the first gate and an upper gate section 20 also referred to as the second gate.

The details of the ramp and gate arrangement is illustrated in FIGURES 4 and 5 which now will be referred to in detail. The ramp 10 is shown pivotally hinged to the platform 12 by hinge arrangement 22. The lower gate section or first gate 18 is shown as being pivotally connected to the floor 24 of the front compartment B of the trailer body 14 by pivot means 26. The upper gate section or second gate 20 is pivotally connected to the sides of the trailer body 14 by pivotal pins 28. A V-shaped bracket 30 is rigidly attached to the second gate 20 and a similar bracket 32 is attached to the first gate 18 on opposite sides thereof and are interconnected in a movable arrangement by a rod 34. The rod 34 is pivotally connected to the bracket 30 on the second gate 20 by pivotal means 36 and is pivotally connected to the bracket 32 on the first gate 18 by pivotal means 38. An angle iron stop or limit 40 is mounted on each side wall of the trailer body 14 adjacent the level of platform 12 to prevent the lower end of the second gate structure 20 from swinging forwardly away from the ramp 10 and thereby preventing the lower gate section 18 from swinging outwardly from underneath the ramp structure 10. The length of the rod 34 between the bracket 30 and the bracket 32 is adjustable by a threaded bolt 42 which may be threaded into a female collar 44 located on the rod 34. In the gate and ramp arrangement shown in FIGURE 4 the gate structure is shown as being closed and the ramp 10 is shown as being in an elevated position to allow animals or livestock to walk thereon. The ramp is supported at one end in a horizontal position by the lower gate structure 18 and is connected at its other end to the platform 12 by the hinge arrangement 22. The weight of the upper gate section 20 will normally hold the gate structure in a normal vertical position.

As seen in FIGURE 5 the lower end of the gate structure 20 has been swung rearwardly and upwardly about the pivotal pins 28 to an inclined position with the lower edge in engagement with roof 45 and the lower gate structure 18 has correspondingly been swung rearwardly to an inclined position through the action of the connecting rod 34. The ramp 10 likewise has been pivoted downwardly to an inclined position through the force of gravity and is shown as resting on the inclined lower gate 18. The operation of swinging the upper gate section 20 to this inclined position is a simple and easy operation which may be performed by a single employee without employing the use of additional equipment.

Now as observed in FIGURE 4 when the ramp is held in its upper or horizontal position livestock will be permitted to walk upon the ramp structure as is illustrated by an animal outlined in dotted line with the transverse ribs or cleats 21 providing traction. The livestock are retained within the compartment A on the platform or upper deck 12 by the upper gate section or second gate section 20 which extends fully across the width of the trailer body 14. Now then by moving the livestock back off the ramp 10 and pivoting the upper gate section 20 to its inclined position as shown in FIGURE 5 the ramp 10 and the lower gate section 18 will be inclined to a position to allow the livestock to walk from the upper platform to the lower base floor 24 to thereby fill the front compartment B indicated in FIGURE 1.

The hinge arrangement 22 for connecting the ramp 10 to the upper deck or platform 12 is shown in detail in FIGURE 6 wherein a hinge socket assembly 46 is shown connected to the upper deck structure 12 by a hinge angle 48. The hinge angle 48 is connected to the upper deck structure by a bolt or rivet 50 and is welded on one side thereof to the upper deck structure and on the other side thereof to the hinge socket assembly. A hinge angle 52 is shown connected to the ramp 10 by a bolt or rivet 54 and is connected to a hinge pipe 56 by welds 58. The hinge pipe 56 extends for the width of the ramp 10 and is pivoted to hinge socket assembly 46. The ramp deck is bent at one end thereof in a curved arc as is shown at 58' to allow the ramp 10 to pivot about the hinge pipe 56 to a desired inclined position and still provide a supporting surface for the animal to walk on.

Figure 2:
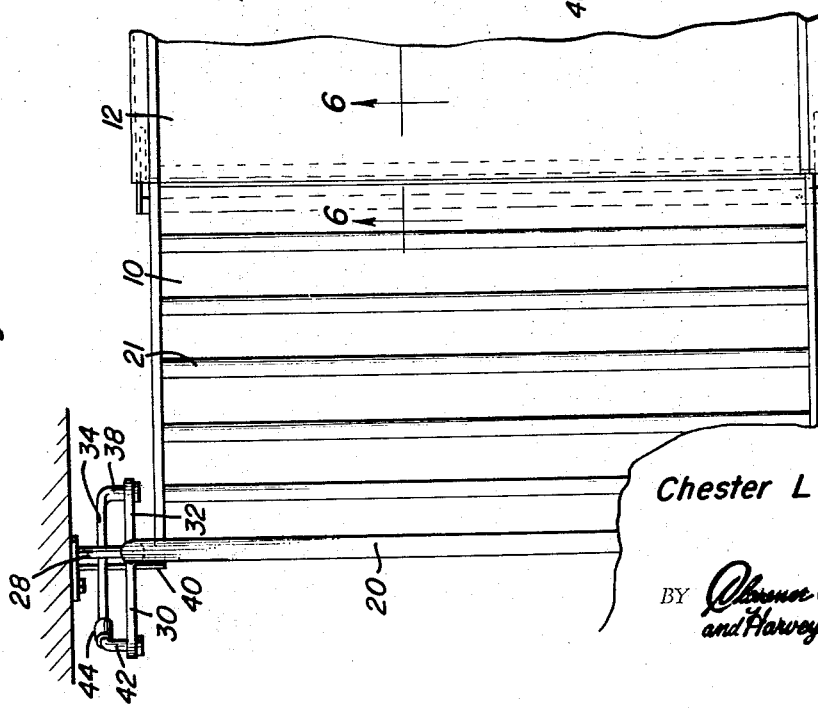
FIGURE 2 is a plan view of the invention taken along section line 2—2 of FIGURE 1.

FIGURE 2 and FIGURE 3 are views showing the ramp and the gate structures in detail and showing the connection between the connecting rod 34 and the brackets 30 and 32 in further detail. The pivot pins 28 for the upper gate structure is shown as being connected to the sides of the trailer body 14 in FIGURE 2 and in FIGURE 3. The stop angle 40 is shown in FIGURE 3 and a partial platform 62 is shown at the lower edge of the lower gate section 18 for engaging under the ramp 10.

Now having described in detail the elements comprising this invention the operation thereof will be described in detail. The gate structure is hand operated and allows the ramp device connected to the upper platform or deck 12 to drop to a position whereby livestock may be moved from the upper deck in the compartment A of the tractor trailer arrangement to the floor 24 in compartment B in the front of the trailer. This operation is also used to unload livestock from compartment B. To perform this operation, the upper gate section 20 is swung to an inclined position so that the upper gate will abut against the roof 45 of the trailer body 14. When the upper gate section is so swung to such an inclined position the connecting rod 34 will force the lower gate section 18 from its normal vertical position to an inclined position as is shown in FIGURE 5. The ramp structure 10 which is normally supported by the lower gate section 18 will be pivoted about the pivot means 22 to an inclined position as is shown in FIGURE 5 and will rest upon the lower gate structure 18 as shown in FIGURE 5. After this operation has been performed it is a simple matter to herd animals or livestock into compartment A, over the ramp structure 10 and into compartment B. When it is desired to remove livestock from the compartment B and from the trailer body the procedure outlined above is reversed. It may be noted that the partial platform 62 on the lower gate structure 18 also provides an arrangement which will allow livestock or animals to walk thereon so that in effect the livestock will walk across the ramp 10 and may walk across the partial platform 62 of the lower gate structure 18 to load into compartment B or to unload therefrom.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a compartment for retaining livestock, said compartment having side walls, a base floor, and a platform disposed between said side walls and at an elevated plane from said base floor the improvement comprising in combination, a ramp hingedly connected to said platform, a lower gate, a hinge means connected to said base floor, said lower gate being connected to said hinge means at one end and supporting said ramp at the other end thereof, a first bracket connected to said lower gate, an upper gate disposed at one end of said ramp and in the space above said ramp, a hinge arrangement connecting said upper gate to said side walls, a second bracket connected to said upper gate, a rod being hingedly connected to said first and second bracket.

2. A compartment for retaining livestock therein comprising, side walls, a base floor located along a substantially horizontal plane surface, a platform located along a substantially horizontal plane elevated from the plane of said base floor, a gate means disposed substantially at the end of and above said platform and normally ranging in a substantially vertical plane, a second gate means disposed substantially at the end of and below said platform and normally being held in a substantially vertical plane, a ramp for moving livestock to and from said platform, said ramp normally being held in a substantially horizontal plane, said second gate being adapted to support said ramp in said substantially horizontal plane, a first pivotal means connecting said ramp to said platform, a second pivotal means connecting said first gate to said side walls and a third pivotal means connecting said second gate to said base floor.

3. The compartment for retaining livestock therein of claim 2 including a first bracket connected to said first gate means, a second bracket connected to said second gate means, and a rod connecting said first bracket to said second bracket.

4. In a compartment for housing livestock therein, said compartment having side walls, a base floor and a platform located in a substantially level plane above said base floor, the improvement comprising in combination, a ramp, a first pivotal means rotatably connecting said ramp to said platform, a first gate, a second pivotal means connecting said first gate to said side walls, a second gate, and a second pivotal means connecting said second gate to said base floor, said ramp is supported by said second gate at one end thereof and is normally held in a substantially horizontal position, a first bracket connected to said first gate, a second bracket connected to said second gate, fourth pivotal means connected to said first bracket, a fifth pivotal means connected to said second bracket, and a rod connected at one end to said first bracket by said fourth pivotal means and at the other end thereof to said second bracket by said fifth pivotal means.

5. In a compartment for retaining livestock therein, said compartment having side walls, a base floor, and a platform elevated from said base floor and being disposed between said side walls, the improvement comprising, in combination, a ramp, a first pivotal means connected to said platform, said first pivotal means rotatably connecting said ramp to said platform, a first gate, a second pivotal means connected to said base floor, said second pivotal means rotatably connecting said first gate to said base floor, a second gate, a third pivotal means connected to said side walls, said third pivotal means rotatably connecting said second gate to said side walls, a first bracket connected to said first gate, a fourth pivotal means connected to said first gate, a second bracket connected to said second gate, a fifth pivotal means connected to said second bracket, and a connecting rod, said connecting rod being connected to said fourth and fifth pivotal means thereby connecting said first gate to said second gate so that movement of one of the gates will result in movement of the other of said gates, said first gate and said second gate having normal positions disposed in a vertical plane, said first gate supporting said ramp in a substantially horizontal plane when said first gate is in said normal position.

6. A compartment according to claim 5 in which said second gate is rotatable about said third pivotal connection from the normal position thereof to rotate said second gate from a vertical plane to an inclined plane.

7. A compartment according to claim 6 in which said first gate is rotated about said second pivotal connection from a normal vertical plane to an inclined plane by said connecting rod when said second gate is rotated about said third pivotal connection.

8. A compartment according to claim 6 in which said ramp is rotatable about said first pivotal connection from a horizontal plane when supported by said first gate when said first gate is in a normal vertical plane to an inclined plane and is adapted to rest on said first gate whereby said first gate and said ramp are inclined substantially along the same plane.

9. In a compartment for retaining livestock therein, said compartment having side walls and plural decks, said plural decks including a base deck disposed in a substantially horizontal plane and a second deck disposed in a substantially horizontal plane elevated from said base deck, the improvement comprising, a ramp, a first pivotal means, said first pivotal means being connected to said second deck, said ramp being rotatably connected to said first pivotal means, a gate, a second pivotal means, said second pivotal means being connected to said base deck, and said gate being rotatably connected to said second pivotal means, said gate normally being disposed in a substantially vertical plane, said ramp being supported in a normally horizontal plane by said gate when said gate is normally disposed in said substantially vertical plane, said gate being adapted to rotate about said second pivotal means to an incline position, said ramp being adapted to rotate about said first pivotal means to an inclined plane when said gate is so rotated to said inclined position, wherein said inclined position of said gate and said inclined plane of said ramp are substantially disposed along a common inclined plane, means on said gate forming a walkway for livestock wherein said ramp and said gate form a combined means for loading and unloading livestock when said gate and said ramp are in said substantially common plane.

References Cited by the Examiner
FOREIGN PATENTS
959,925 6/1964 Great Britain.

BENJAMIN HERSH, *Primary Examiner.*

P. GOODMAN, *Assistant Examiner.*